United States Patent
McCaffrey et al.

(10) Patent No.: US 10,094,232 B2
(45) Date of Patent: Oct. 9, 2018

(54) SELF CRYSTALLINE ORIENTATION FOR INCREASED COMPLIANCE

(71) Applicant: United Technologies Corporation, Hartford, CT (US)

(72) Inventors: Michael G. McCaffrey, Windsor, CT (US); Eric A. Hudson, Harwinton, CT (US)

(73) Assignee: United Technologies Corporation, Farmington, CT (US)

( * ) Notice: Subject to any disclaimer, the term of this patent is extended or adjusted under 35 U.S.C. 154(b) by 399 days.

(21) Appl. No.: 14/825,812

(22) Filed: Aug. 13, 2015

(65) Prior Publication Data

US 2017/0044918 A1   Feb. 16, 2017

(51) Int. Cl.

| | |
|---|---|
| F01D 11/00 | (2006.01) |
| F01D 11/02 | (2006.01) |
| F16J 15/44 | (2006.01) |
| F01D 5/16 | (2006.01) |
| F01D 5/22 | (2006.01) |
| F01D 5/24 | (2006.01) |
| F01D 11/16 | (2006.01) |
| F02C 7/28 | (2006.01) |

(52) U.S. Cl.
CPC ............. *F01D 11/02* (2013.01); *F01D 5/16* (2013.01); *F01D 5/22* (2013.01); *F01D 5/24* (2013.01); *F01D 11/006* (2013.01); *F01D 11/16* (2013.01); *F02C 7/28* (2013.01); *F16J 15/44* (2013.01); *F05D 2220/323* (2013.01); *F05D 2240/55* (2013.01); *F05D 2250/71* (2013.01); *F05D 2300/17* (2013.01)

(58) Field of Classification Search
CPC ..... F01D 11/02; F16J 15/44; F05D 2220/323; F05D 2240/55; F05D 2250/71; F05D 2300/17

See application file for complete search history.

(56) References Cited

U.S. PATENT DOCUMENTS

| 5,679,989 A | 10/1997 | Buscher |
| 5,957,440 A | 9/1999 | Jones |

(Continued)

OTHER PUBLICATIONS

Koblar, D., "Evaluation of the frequency-dependent Young's modulus and damping factor of rubber from experiment and their implementation in a finite-element analysis", Experimental Techniques, published online Nov. 11, 2013, DOI: 10.1111/ext.12066.

(Continued)

*Primary Examiner* — Gilbert Lee
(74) *Attorney, Agent, or Firm* — O'Shea Getz P.C.

(57) ABSTRACT

Aspects of the disclosure are directed to a seal comprising: a shoe, and at least one beam coupled to the shoe, wherein the seal includes a single crystal material with a predetermined crystalline orientation. Aspects of the disclosure are directed to a method for designing a seal, comprising: obtaining a requirement associated with at least one of: a geometrical profile of the seal, a temperature range over which the seal is to operate, a natural frequency associated with the seal, or a range of deflection associated with the seal, selecting a crystalline orientation for a single crystal material of the seal based on the requirement, and fabricating the seal based on the selected crystalline orientation.

21 Claims, 3 Drawing Sheets

(56) References Cited

U.S. PATENT DOCUMENTS

| | | | |
|---|---|---|---|
| 6,307,287 B1 | 10/2001 | Garrett | |
| 7,038,356 B2 | 5/2006 | Athanas | |
| 7,669,910 B2 | 3/2010 | Charlier | |
| 2011/0081235 A1* | 4/2011 | Shah | F01D 5/16 415/170.1 |
| 2011/0121519 A1 | 5/2011 | Justak | |
| 2013/0234399 A1 | 9/2013 | Justak | |
| 2013/0259660 A1 | 10/2013 | Dale | |
| 2014/0119912 A1 | 5/2014 | Bidkar et al. | |
| 2016/0031006 A1* | 2/2016 | Shah | F01D 25/24 60/752 |
| 2016/0251971 A1* | 9/2016 | Dusterhoft | C23C 4/11 |
| 2016/0281511 A1* | 9/2016 | Hille | F01D 5/005 |

OTHER PUBLICATIONS

Christopher Hopkins, "Introduction to Designing Elastomeric Vibration Isolators", OPTI 521, Dec. 2009.

Yasuko Takei, "Experimental Study of Attenuation and Dispersion Over a Broad Frequency Range: 1. The Apparatus", Journal of Geophysical Research, Sep. 21, 2011, DOI: 10.1029/2011JB008382.

A.V. Srinivasan, "Flutter and Resonant Vibration Chracteristics of Engine Blades", The American Society of Mechanical Engineers, 97-GT-533, 1997.

S. Y. Yoon, "Control of Surge in Centrifugal Compressors by Active Magnetic Bearings Chapter 2 Introduction to Rotor Dynamics", Advances in Industrial Control, 2013, DOI: 10.1007/978-1-4471-4240-9_2.

Wikipedia, "Young's Modulus", downloaded Jun. 24, 2015, available at: <https://en.wikipedia.org/wiki/Young%27s_modulus>.

EP search report for EP16184225.7 dated Feb. 9, 2017.

\* cited by examiner

SELF CRYSTALLINE ORIENTATION FOR INCREASED COMPLIANCE

BACKGROUND

In connection with an aircraft engine, a seal may be used to isolate, or reduce a flow of fluid between, two or more interfaces that are separated by the seal. The conditions in which the seal operates may vary and frequently are expressed in terms of temperature, pressure, and rotational speed.

An operation requirement for aircraft engines frequently includes the ability to tolerate eccentricity between a rotor axis and a shoe of the seal. Large displacements may need to be accommodated while still providing an adequate resonant frequency margin.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a seal comprising: a shoe, and at least one beam coupled to the shoe, wherein the seal includes a single crystal material with a predetermined crystalline orientation. In some embodiments, the single crystal material is a nickel-based alloy. In some embodiments, the orientation accommodates a requirement associated with at least a geometrical profile of the seal. In some embodiments, the geometrical profile is specified in terms of at least a radius of the seal. In some embodiments, the geometrical profile is specified in terms of at least a length of the at least one beam. In some embodiments, the orientation accommodates a requirement associated with at least a natural frequency associated with the seal. In some embodiments, the orientation provides for the natural frequency being greater than a frequency associated with a speed of a rotating component in an amount that is greater than a threshold. In some embodiments, the orientation accommodates a requirement associated with at least a range of deflection associated with the seal. In some embodiments, the seal is included in an engine. In some embodiments, the seal is included in an engine of an aircraft. In some embodiments, the seal is associated with one of a fan section of the engine, a compressor section of the engine, or a turbine section of the engine. In some embodiments, the seal is configured as an aerodynamic seal and is coupled to a first structure that is fixed and a second structure that rotates relative to the first structure.

Aspects of the disclosure are directed to a method for designing a seal, comprising: obtaining a requirement associated with at least one of: a geometrical profile of the seal, a temperature range over which the seal is to operate, a natural frequency associated with the seal, or a range of deflection associated with the seal, selecting a crystalline orientation for a single crystal material of the seal based on the requirement, and fabricating the seal based on the selected crystalline orientation. In some embodiments, the requirement is associated with at least the geometrical profile of the seal. In some embodiments, the geometrical profile is specified in terms of at least a radius of the seal. In some embodiments, the geometrical profile is specified in terms of at least a length of at least one beam of the seal. In some embodiments, the requirement is associated with at least the natural frequency associated with the seal. In some embodiments, the crystalline orientation provides for a natural frequency that is greater than a frequency associated with a speed of a rotating component in an amount that is greater than a threshold. In some embodiments, the requirement is associated with at least the range of deflection associated with the seal. In some embodiments, the requirement is associated with at least the temperature range over which the seal is to operate.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
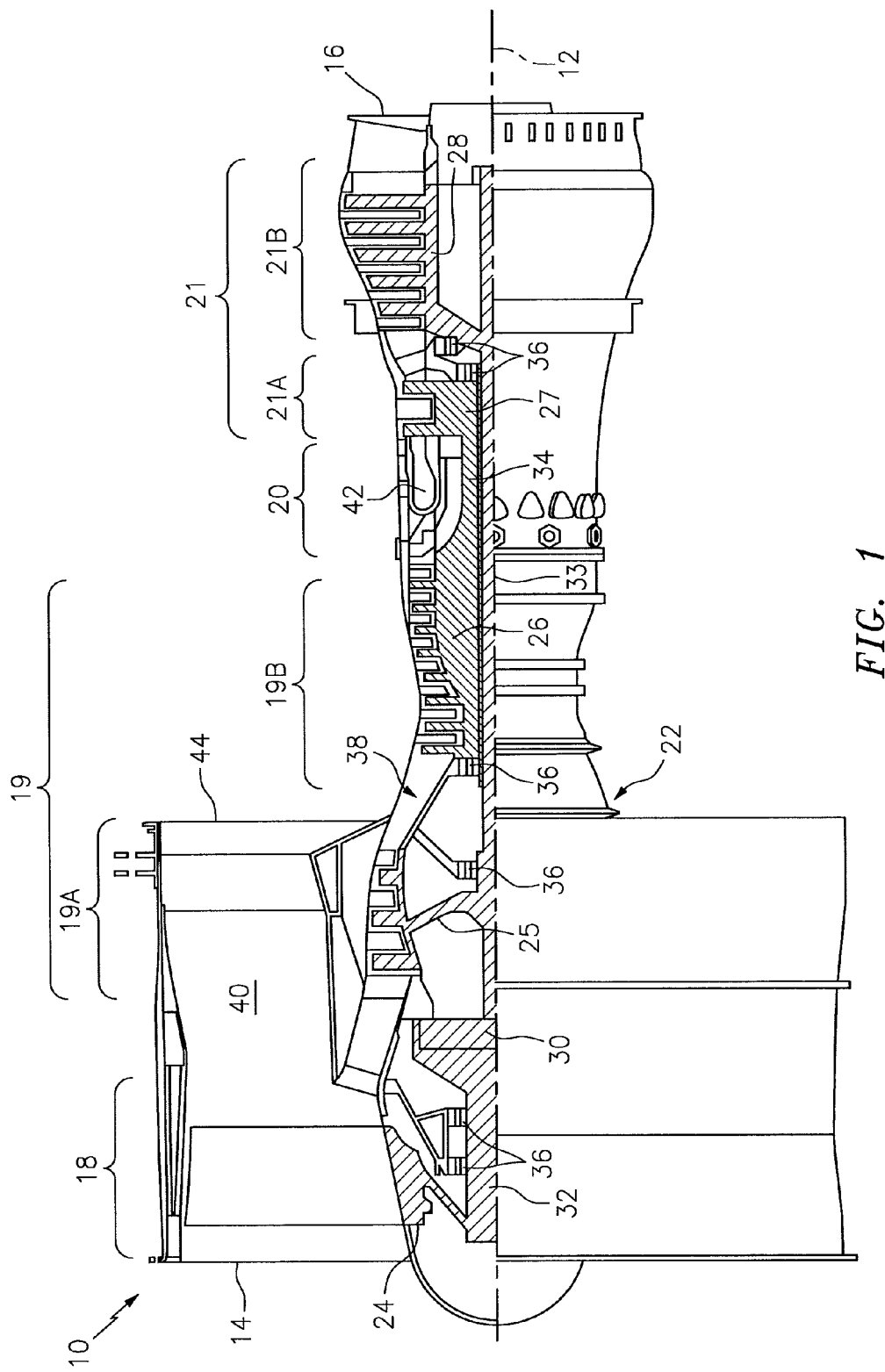
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a seal. In some embodiments, the seal may include at least some characteristics that are common with a HALO™ seal provided by, e.g., Advanced Technologies Group, Inc. of Stuart, Fla. In some embodiments, a beam structure may be configured with a predetermined crystalline orientation to provide for a predetermined stiffness and shoe primary resonant frequency margin.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for an engine of an aircraft (e.g., an airplane, a helicopter, etc.).

As described above, and in accordance with aspects of this disclosure, a seal may be used for purposes of isolation (e.g., fluid isolation) between two or more interfaces. For example, a seal may be used in connection with one or more of the devices/components associated with the engine 10. Such devices/components may include, or be associated with, the fan section 18, the compressor section 19, the turbine section 21, etc. In some embodiments, a seal may be used as an aerodynamic seal between a first structure and a second structure. The first structure may rotate relative to the second structure, e.g., the first structure may rotate while the second structure may be fixed.

Figure 2:
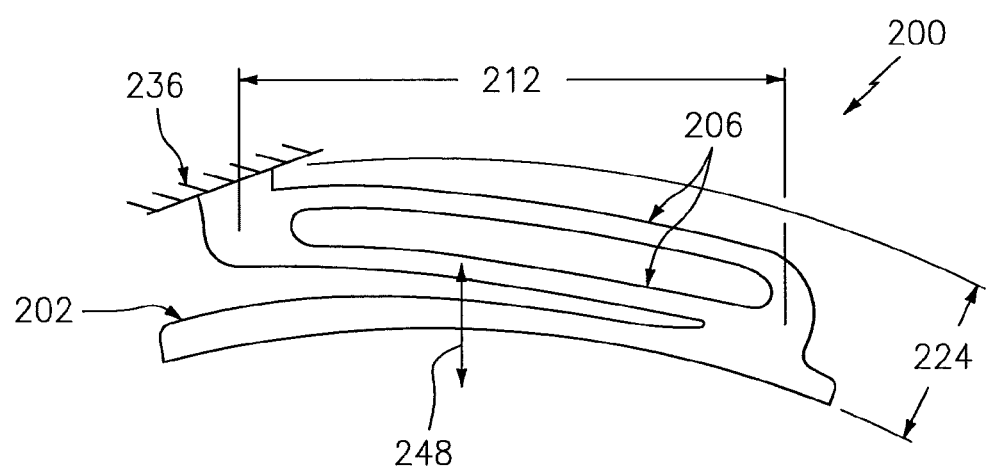
FIG. 2 illustrates an exemplary seal in accordance with aspects of this disclosure.

Referring now to FIG. 2, a seal 200 in accordance with aspects of this disclosure is shown. The seal 200 may include a shoe 202 and one or more beams 206. The shoe 202 may interface to a first structure (e.g., a rotating structure) and the beams 206 may interface to a second structure (e.g., a fixed structure). In this respect, a profile/shape of the shoe 202 and the beams 206 may be manufactured to accommodate a profile/shape of the first and second structures, respectively.

The shoe 202 and the beams 206 may be fabricated of one or more materials, such as for example nickel-based alloys. The shoe 202 and the beams 206 may be fabricated with the same or different materials relative to one another. The shoe 202 and the beams 206 may be fabricated as a unitary piece. The shoe and the beams 206 may be fabricated as separate pieces and then coupled to one another using, for example, a welding technique, a brazing technique, a bonding technique, mechanical coupling techniques (e.g., riveting), etc.

One or more properties/parameters may be associated with the seal 200. For example, reference character/arrows 212 refers to the length of the beams 206. Reference character/arrows 224 refers to a radius of the seal 200. Reference character 236 refers to a ground, which may serve as a frame of reference or reference point for the seal 200 in terms of, e.g., movements or deflections. Reference character/arrows 248 refers to a range of deflection that may need to be accommodated based on an operational environment where the seal 200 is used. Each of the beams 206 and/or the shoe 202 may have its own associated natural frequency, and the values of those frequencies may or might not be the same.

Based on the properties/parameters described above, various trade-offs may be made as part of a procedure to design and fabricate the seal 200. For example, in application environments where space is at a premium it may be desirable to package the seal in as small a profile as possible (which may result in reducing/minimizing at least one of the length 212 or the radius 224). In some application environments, such as for example in connection with a LPT section 21B (see FIG. 1) rim seal, a large displacement/deflection 248 may need to be accommodated. In other application environments where a large displacement 248 might not need to be accommodated, one or more orientations associated with the seal 200 may be selected to increase/maximize a natural frequency of at least one of the shoe 202 or one or more of the beams 206.

As described above, the seal 200 may be made using one or more materials. In some embodiments, a single crystal material may be used. A tensile or elastic modulus (also referred to as Young's modulus in the art) may vary based on a crystalline orientation. Accordingly, a seal (e.g., the seal 200) may be designed with a specific crystalline orientation to provide a predetermined stiffness and (primary) natural frequency. For example, the natural frequency may be selected to be above the speed of a rotating component in an amount greater than a threshold in order to ensure stability (e.g., in order to avoid a resonance between the seal and the rotating component).

A crystalline orientation that is used may be specified in terms of one or more coordinate systems, such as for example Cartesian coordinates, polar coordinates, cylindrical coordinates, spherical coordinates, etc.

In some embodiments, one or more unit vectors may be used to specify (a directional profile associated with) the crystalline orientation. As an illustrative example using a Cartesian coordinate system, a crystalline orientation specified by the triple <001> may equate to a Young's modulus of approximately 18 megapounds per square inch (msi) (approximately 124 GPa). This value for the Young's modulus may be less than the Young's modulus associated with an isotropic orientation (which may be approximately equal to 30 msi (approximately 207 GPa)), such that at 18 msi (approximately 124 GPa) a seal 200 with a shorter length 212 or shorter radius 224 and with greater deflection capability 248 (without exceeding an allowable stress) may be obtained. Conversely, a crystalline orientation specified by the triple <111> may equate to a Young's modulus of approximately 45 msi (approximately 310 GPa), which may be suitable to a longer length 212 or longer radius 224 or a reduction in the number of shoes 202 that are used.

In the examples described above regarding the selection of particular crystalline orientations, it is noted that the crystalline orientation that is selected can be used to tailor the natural frequency for a given geometrical profile for the seal. For example, a crystalline orientation in accordance with the triple <001> may result in a natural frequency that is less than the natural frequency of an isotropic orientation. Similarly, a crystalline orientation in accordance with the triple <111> may result in a natural frequency that is greater than the isotropic orientation.

Figure 3:
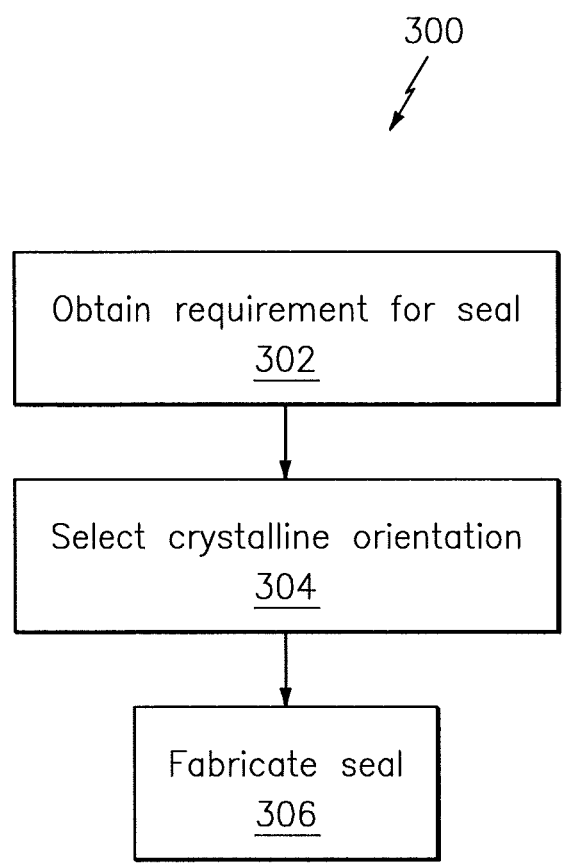
FIG. 3 illustrates an exemplary method for designing a seal in accordance with aspects of this disclosure.

Referring now to FIG. 3, a method 300 is shown. The method 300 may be used to design a seal (e.g., the seal 200).

In block 302, a requirement for the seal may be obtained. The requirement may be specified in terms of one or more of: a geometrical profile of the seal, a temperature range over which the seal is to operate, a natural frequency associated with the seal, or a range of deflection associated with the seal.

In block 304, a crystalline orientation for a single crystal material of the seal may be selected. The selection of block 304 may be based on the requirement of block 302.

In block 306, the seal may be fabricated. The fabrication of block 306 may be based on the selected crystalline orientation of block 304.

Technical effects and benefits of the disclosure include a provisioning of a seal that may be used to realize an increase in displacement range, temperature range, and/or range of rotational speeds relative to the use of a conventional seal. In some embodiments, such features may be obtained without increasing a size/footprint of the seal. Accordingly, various options are available in terms of seal packaging. A spring-rate of beams can be tailored from a reduction of approximately 40% to an increase of approximately 50% over conventional Nickel-based alloys. Aspects of the disclosure may provide flexibility in terms of properties/parameters associated with a seal. Such flexibility may be used to accommodate requirements that may vary from a first application environment to a second application environment.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A seal for a rotary component of a gas turbine engine, the seal comprising:
   plural members, including a first member defining a first beam, a second member defining a second beam, and a third member defining a shoe,
   the plural members being spaced in a radial direction, the first member being disposed at a radial outer end of the seal, the second member being disposed on a radial middle of the seal, and the third member being disposed at a radial inner end of the seal;
   the plural members extending in a lengthwise direction, the first member and second member being connected at a lengthwise inner end of the seal, and the plural members being connected at a lengthwise outer end of the seal;
   wherein the seal comprises a single crystalline structure that is oriented such that a natural frequency for at least two of the plural members differs;
   wherein the orientation of the single crystalline structure provides for the natural frequency being greater than a frequency associated with a speed of the rotary component in an amount greater than a threshold.

2. The seal of claim 1, wherein the single crystalline structure is a nickel-based alloy.

3. The seal of claim 1, wherein the orientation of the single crystalline structure accommodates a requirement associated with at least a geometrical profile of the seal.

4. The seal of claim 3, wherein the geometrical profile is specified in terms of at least a radius of the seal.

5. The seal of claim 3, wherein the geometrical profile is specified in terms of at least a length of at least one of the first beam or the second beam.

6. The seal of claim 1, wherein the orientation of the single crystalline structure accommodates a requirement associated with at least a range of deflection associated with the seal.

7. The seal of claim 1, wherein the seal is included in the engine.

8. The seal of claim 1, wherein the seal is included in the engine of an aircraft.

9. The seal of claim 8, wherein the seal is associated with one of a fan section of the engine, a compressor section of the engine, or a turbine section of the engine.

10. The seal of claim 1, wherein the seal is configured as an aerodynamic seal and is coupled to a first structure that is fixed and a second structure that rotates relative to the first structure, the second structure including the rotary component.

11. The seal of claim 1, wherein the crystalline orientation is specified by the triple <111>.

12. The seal of claim 1, wherein the seal includes a first tab at the lengthwise inner end of the seal, the first tab extending in the radial outer direction from the radial outer end of the seal for mounting to a ground.

13. The seal of claim 12, wherein the seal includes a second tab at the lengthwise outer end of the seal, the second tab extending in the lengthwise outer direction from the radial inner end of the seal.

14. A method for designing a seal, comprising:
   obtaining a requirement associated with at least:
      a natural frequency associated with the seal;
   selecting a crystalline orientation for a single crystal material of the seal based on the requirement; and
   fabricating the seal based on the selected crystalline orientation,
   wherein the crystalline orientation provides for the natural frequency being greater than a frequency associated with a speed of a rotating component in an amount that is greater than a threshold.

15. The method of claim 14, wherein the requirement is associated with at least a geometrical profile of the seal.

16. The method of claim 15, wherein the geometrical profile is specified in terms of at least a radius of the seal.

17. The method of claim 15, wherein the geometrical profile is specified in terms of at least a length of at least one beam of the seal.

18. The method of claim 14, wherein the requirement is associated with at least a range of deflection associated with the seal.

19. The method of claim 14, wherein the requirement is associated with at least a temperature range over which the seal is to operate.

20. The method of claim 14, wherein the crystalline orientation is specified by the triple <111>.

21. A gas turbine engine including a rotating component, the rotating component including a fluid seal, the seal comprising:
   plural members, including a first member defining a first beam, a second member defining a second beam, and a third member defining a shoe, the plural members being spaced in a radial direction, the first member being disposed at a radial outer end of the seal, the second member being disposed on a radial middle of the seal, and the third member being disposed at a radial inner end of the seal;

the plural members extending in a lengthwise direction, the first member and second member being connected at a lengthwise inner end of the seal, and the plural members being connected at a lengthwise outer end of the seal;

wherein the seal comprises a single crystalline structure that is oriented such that a natural frequency for at least two of the plural members differs.

\* \* \* \* \*